(12) United States Patent
Sellinger et al.

(10) Patent No.: US 10,502,086 B2
(45) Date of Patent: Dec. 10, 2019

(54) SYSTEM AND METHOD FOR ACTUATING GAS TURBINE ENGINE COMPONENTS USING INTEGRATED JAMMING DEVICES

(71) Applicant: General Electric Company, Schenectady, NY (US)

(72) Inventors: Aaron Todd Sellinger, Cincinnati, OH (US); Nicholas Joseph Kray, Mason, OH (US); Wendy Wenling Lin, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 994 days.

(21) Appl. No.: 15/071,264

(22) Filed: Mar. 16, 2016

(65) Prior Publication Data

US 2017/0268374 A1  Sep. 21, 2017

(51) Int. Cl.
*F01D 17/14* (2006.01)
*F01D 5/14* (2006.01)
(Continued)

(52) U.S. Cl.
CPC ........... *F01D 17/141* (2013.01); *F01D 5/148* (2013.01); *F01D 17/10* (2013.01); *F02C 7/042* (2013.01);
(Continued)

(58) Field of Classification Search
CPC ........ F01D 17/141; F01D 5/148; F01D 17/10; F04D 27/023; F04D 27/0215;
(Continued)

(56) References Cited

U.S. PATENT DOCUMENTS 2,616,509 A * 11/1952 Thomas .................... B64C 3/30
244/113
2,763,448 A    9/1956 Davie, Jr.
(Continued)

FOREIGN PATENT DOCUMENTS

DE    102 56 008 B3    8/2004
EP    2 985 121 A2     2/2016
(Continued)

OTHER PUBLICATIONS

Extended European Search Report and Opinion issued in connection with corresponding EP Application No. 17160859.9 dated Jul. 21, 2017.

*Primary Examiner* — Eldon T Brockman
(74) *Attorney, Agent, or Firm* — Dority & Manning, P.A.

(57) ABSTRACT

A system for actuating components of a gas turbine engine may generally include a turbine component incorporating a jamming device. The jamming device may include a bladder and a jammable media contained within the bladder. The jammable media may be jammable within the bladder from an unjammed state, wherein a fluid is contained within the bladder, to a jammed state, wherein the fluid is at least partially evacuated from the bladder. The system may also include a fluid coupling in fluid communication with the bladder. A portion of the turbine component may be located at a first position when the jammable media is in the unjammed state. Additionally, such portion of the turbine component may be located at a second position when the jammable media is in the jammed state.

20 Claims, 9 Drawing Sheets

(51) Int. Cl.
  *F02C 7/042*    (2006.01)
  *F02C 9/18*     (2006.01)
  *F01D 17/10*    (2006.01)
  *F04D 29/56*    (2006.01)
  *F04D 27/02*    (2006.01)

(52) U.S. Cl.
  CPC .............. *F02C 9/18* (2013.01); *F04D 27/023* (2013.01); *F04D 27/0215* (2013.01); *F04D 29/563* (2013.01); *F05D 2220/32* (2013.01); *F05D 2250/90* (2013.01); *F05D 2270/20* (2013.01); *F05D 2270/60* (2013.01); *F05D 2270/64* (2013.01); *F05D 2270/65* (2013.01); *F05D 2300/501* (2013.01); *Y02T 50/672* (2013.01); *Y02T 50/673* (2013.01)

(58) Field of Classification Search
  CPC .......... F04D 29/563; F02C 9/18; F02C 7/042; F05D 2270/64; F05D 2270/65; F05D 2220/32; F05D 2250/90; F05D 2270/60; F05D 2270/20; F05D 2300/501; Y02T 50/673; Y02T 50/672
  See application file for complete search history.

(56) References Cited

U.S. PATENT DOCUMENTS

| | | | |
|---|---|---|---|
| 2,979,287 A | 4/1961 | Ross | |
| 3,172,621 A * | 3/1965 | Erwin | B64C 3/00 165/903 |
| 3,614,260 A * | 10/1971 | Ellinger | F01D 5/14 416/132 R |
| 3,711,039 A * | 1/1973 | James | B64C 3/30 244/214 |
| 4,613,102 A | 9/1986 | Kageorge | |
| 6,082,667 A | 7/2000 | Haggard | |
| 6,910,661 B2 | 6/2005 | Docketer et al. | |
| 8,202,056 B2 | 6/2012 | Rice | |
| 8,366,057 B2 | 2/2013 | Vos et al. | |
| 8,387,912 B2 | 3/2013 | Houck, II | |
| 8,500,406 B2 | 8/2013 | Jiménez et al. | |
| 8,678,324 B2 * | 3/2014 | Hemmelgarn | B64C 3/48 244/219 |
| 8,783,625 B2 * | 7/2014 | Lutke | B64C 3/46 244/219 |
| 9,162,754 B2 | 10/2015 | Boespflug et al. | |
| 9,764,220 B2 * | 9/2017 | Keating | A63C 19/04 |
| 10,041,355 B2 * | 8/2018 | Hussain | F01D 5/148 |
| 2009/0290982 A1 | 11/2009 | Madsen et al. | |
| 2010/0329851 A1 | 12/2010 | Nilsson | |
| 2011/0084174 A1 * | 4/2011 | Hemmelgarn | B64C 3/48 244/200 |
| 2012/0280421 A1 * | 11/2012 | Keating | A63C 19/04 264/227 |
| 2013/0302168 A1 | 11/2013 | Kray et al. | |
| 2015/0107233 A1 | 4/2015 | Ou et al. | |
| 2015/0151830 A1 | 6/2015 | Xi et al. | |
| 2015/0251747 A1 | 9/2015 | Roe et al. | |
| 2016/0146015 A1 * | 5/2016 | Hussain | F01D 5/148 415/148 |

FOREIGN PATENT DOCUMENTS

| | | |
|---|---|---|
| JP | 2006-248456 A | 9/2006 |
| WO | 98/49478 A1 | 11/1998 |

\* cited by examiner

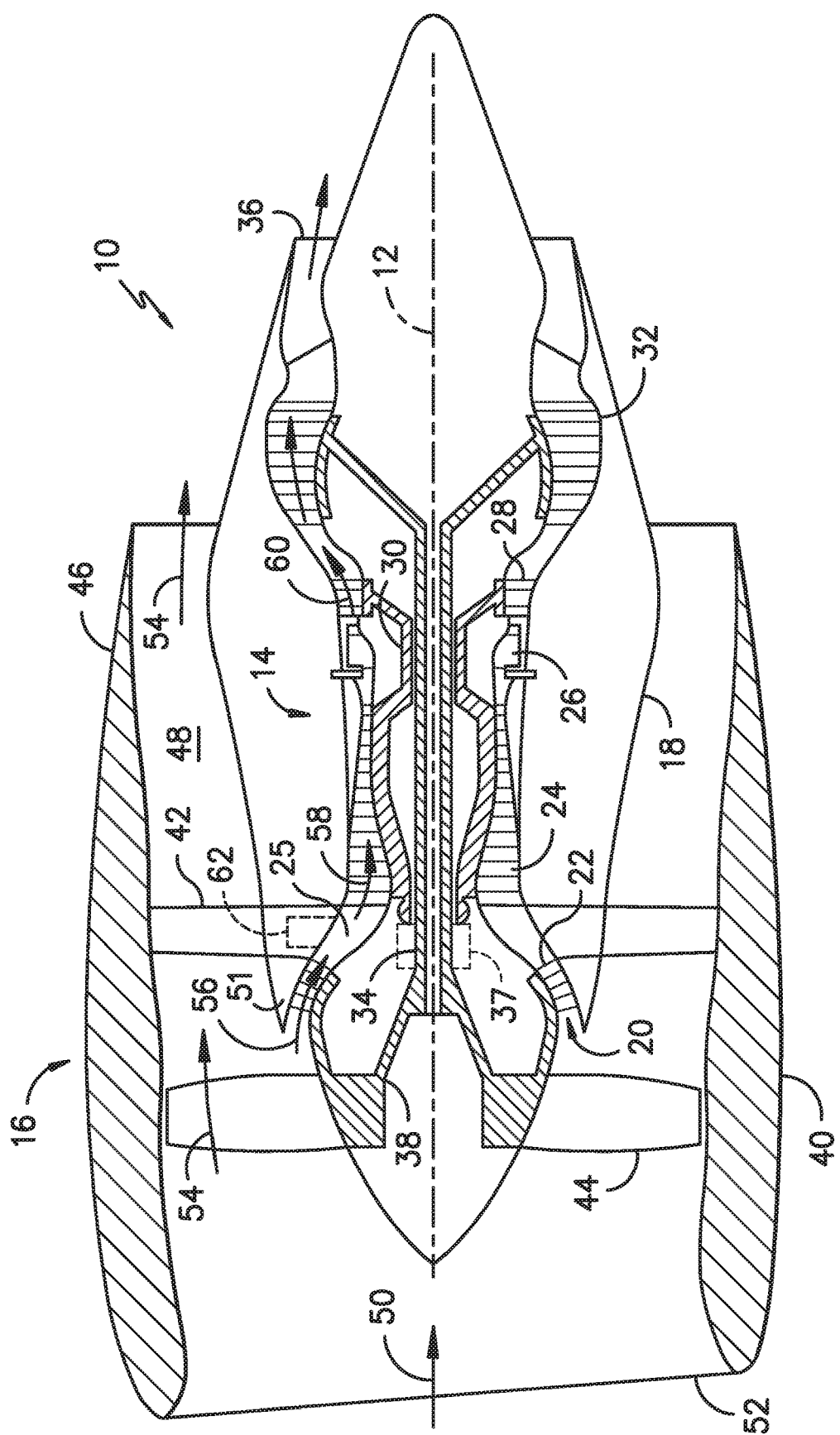
FIG. -1-

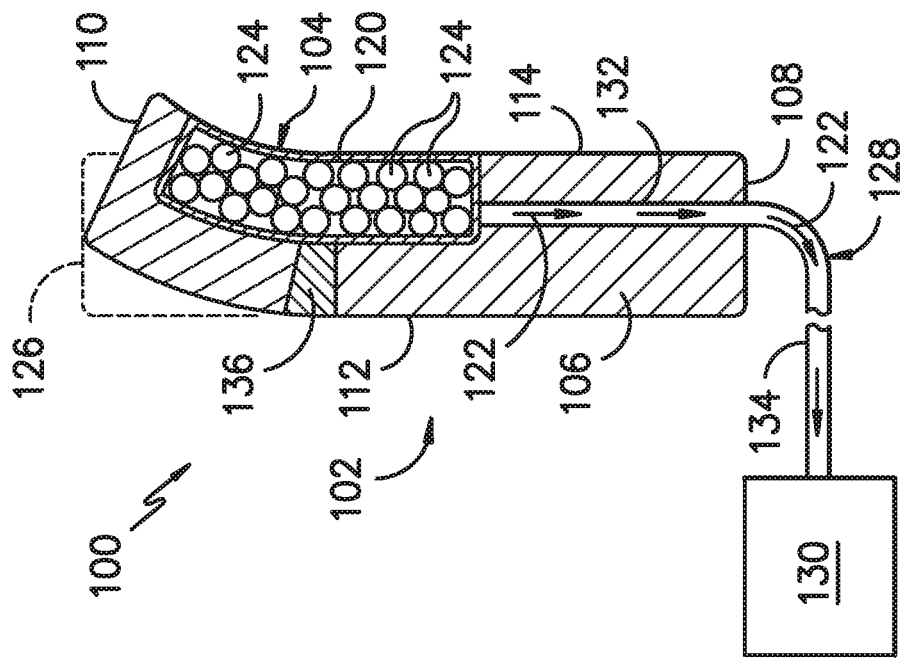
FIG. -2-
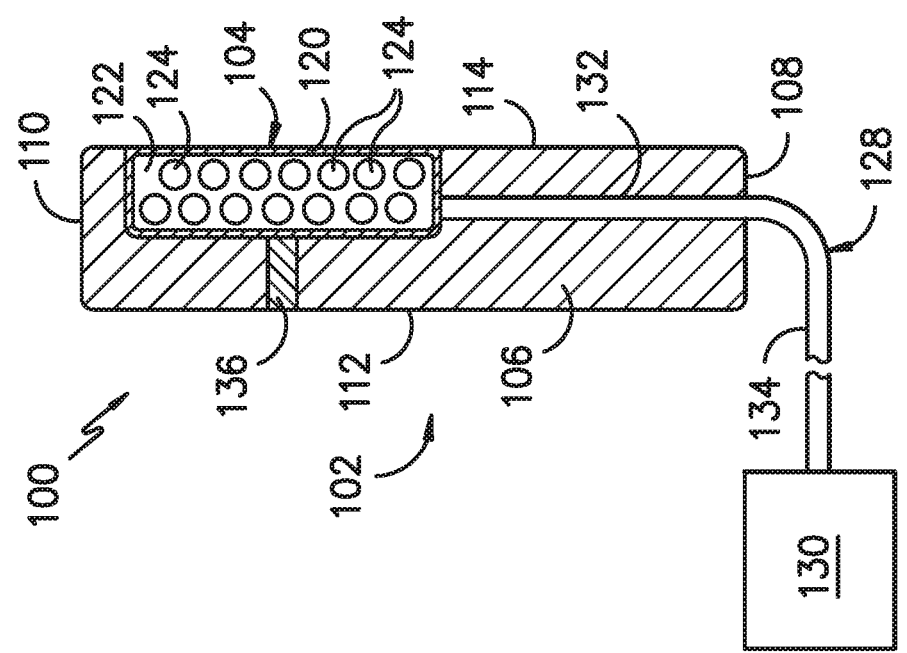
FIG. -3-

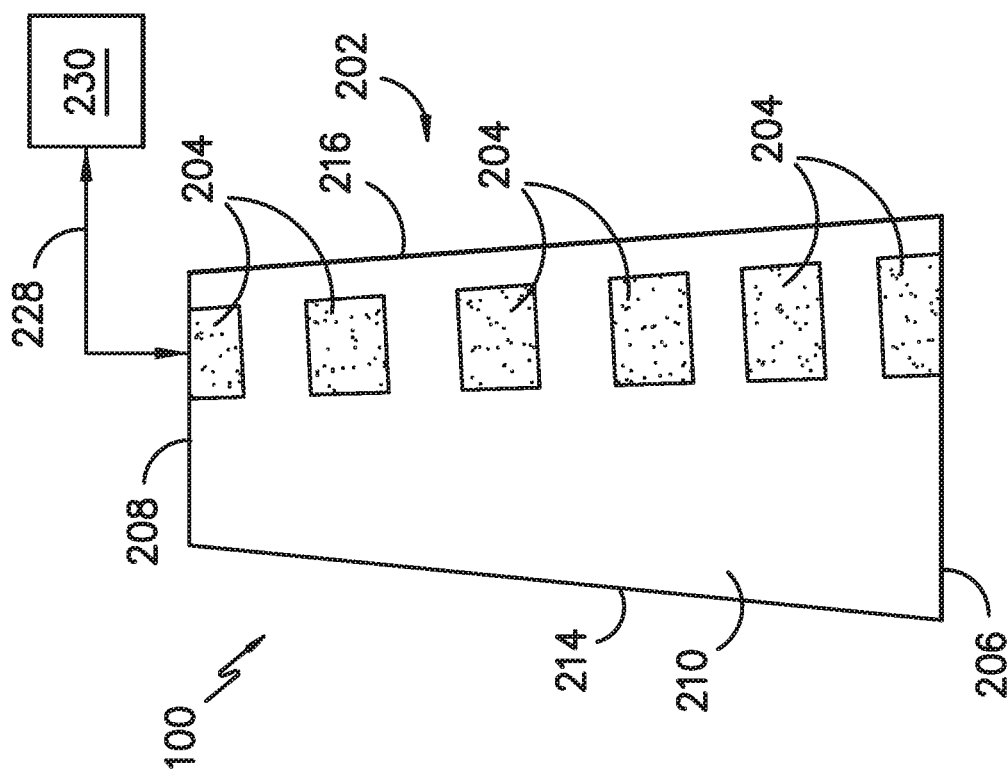
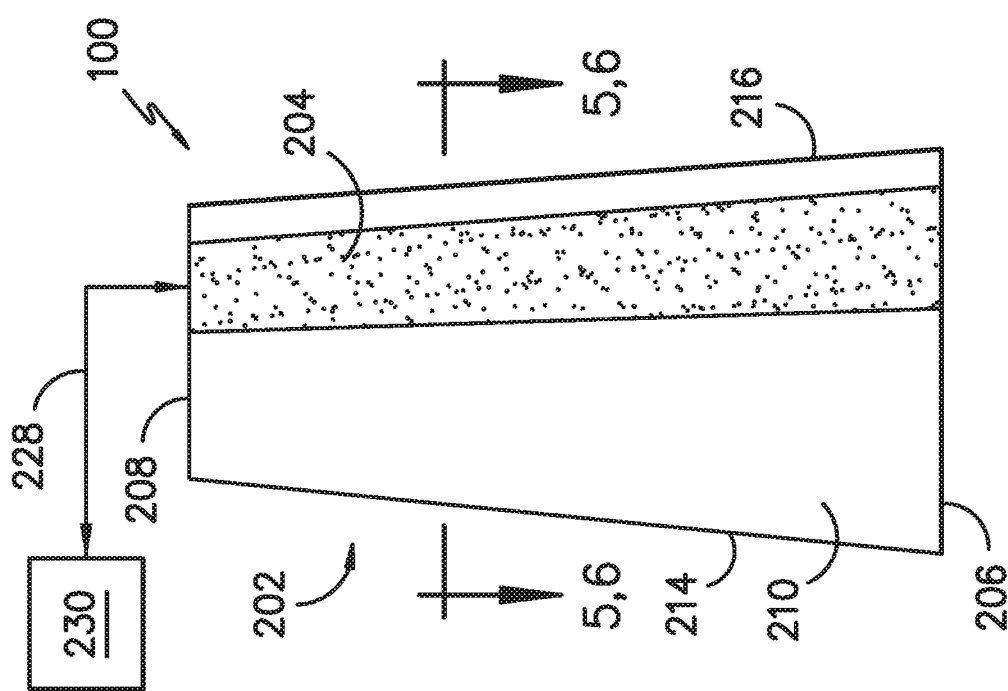

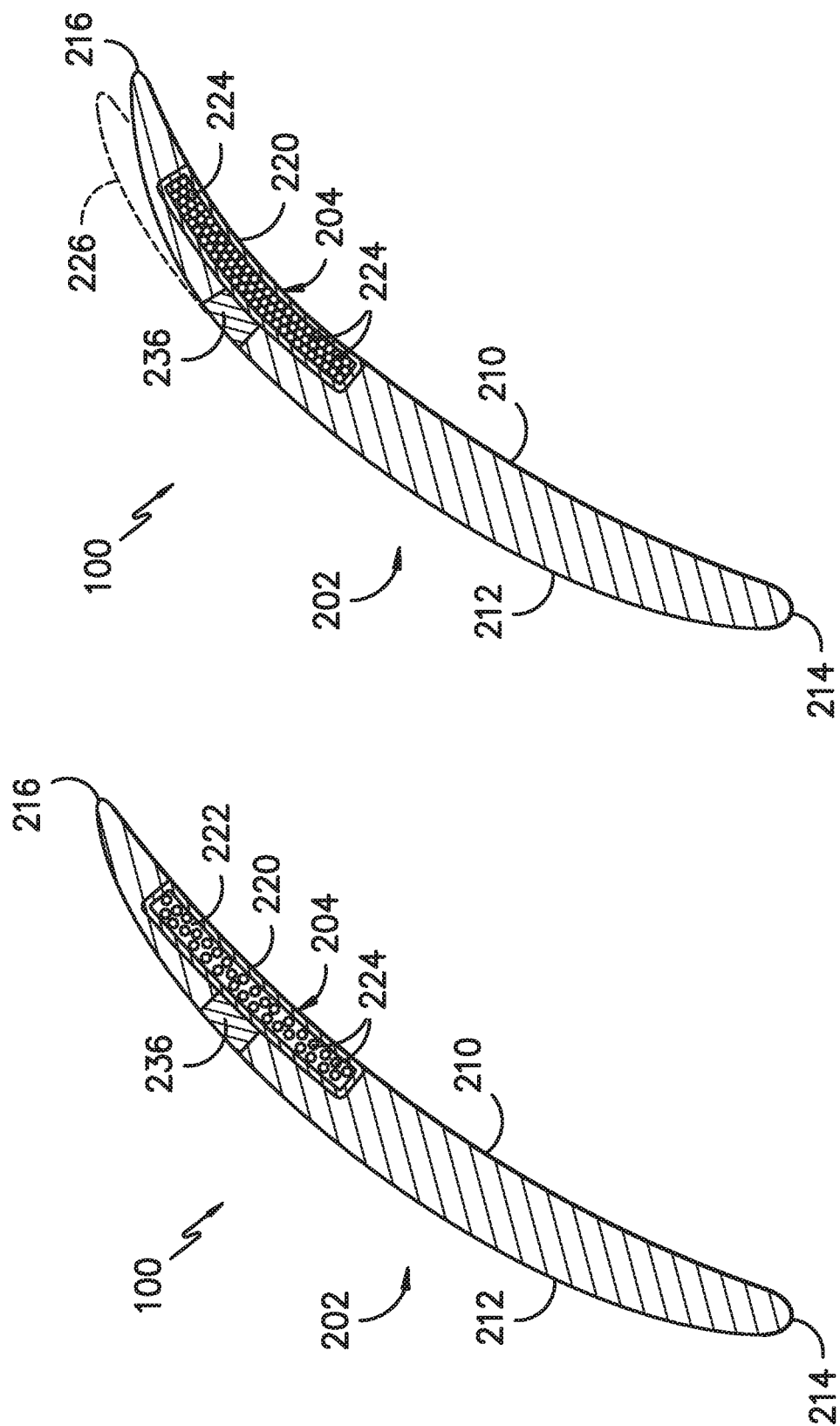

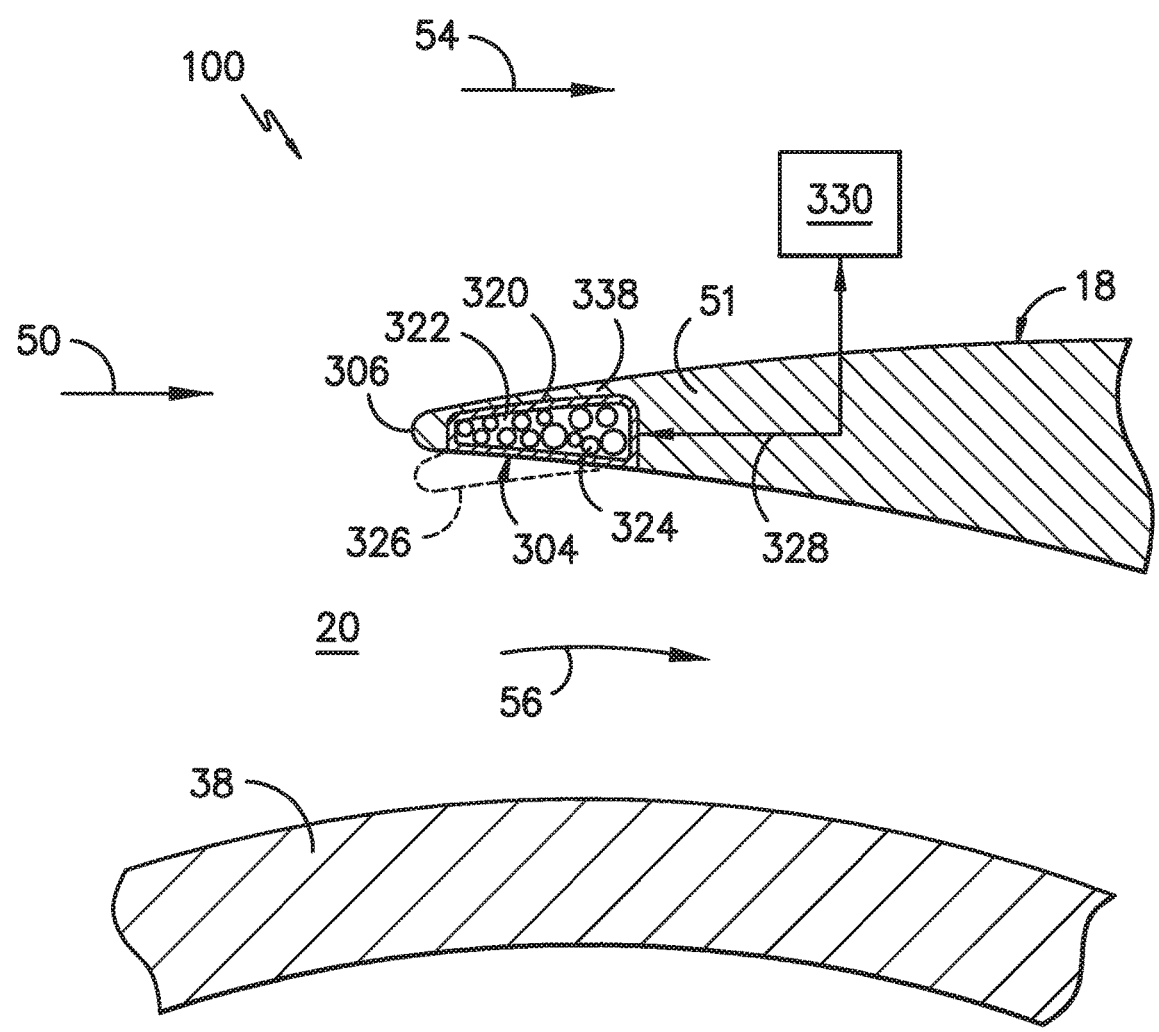
FIG. -8-

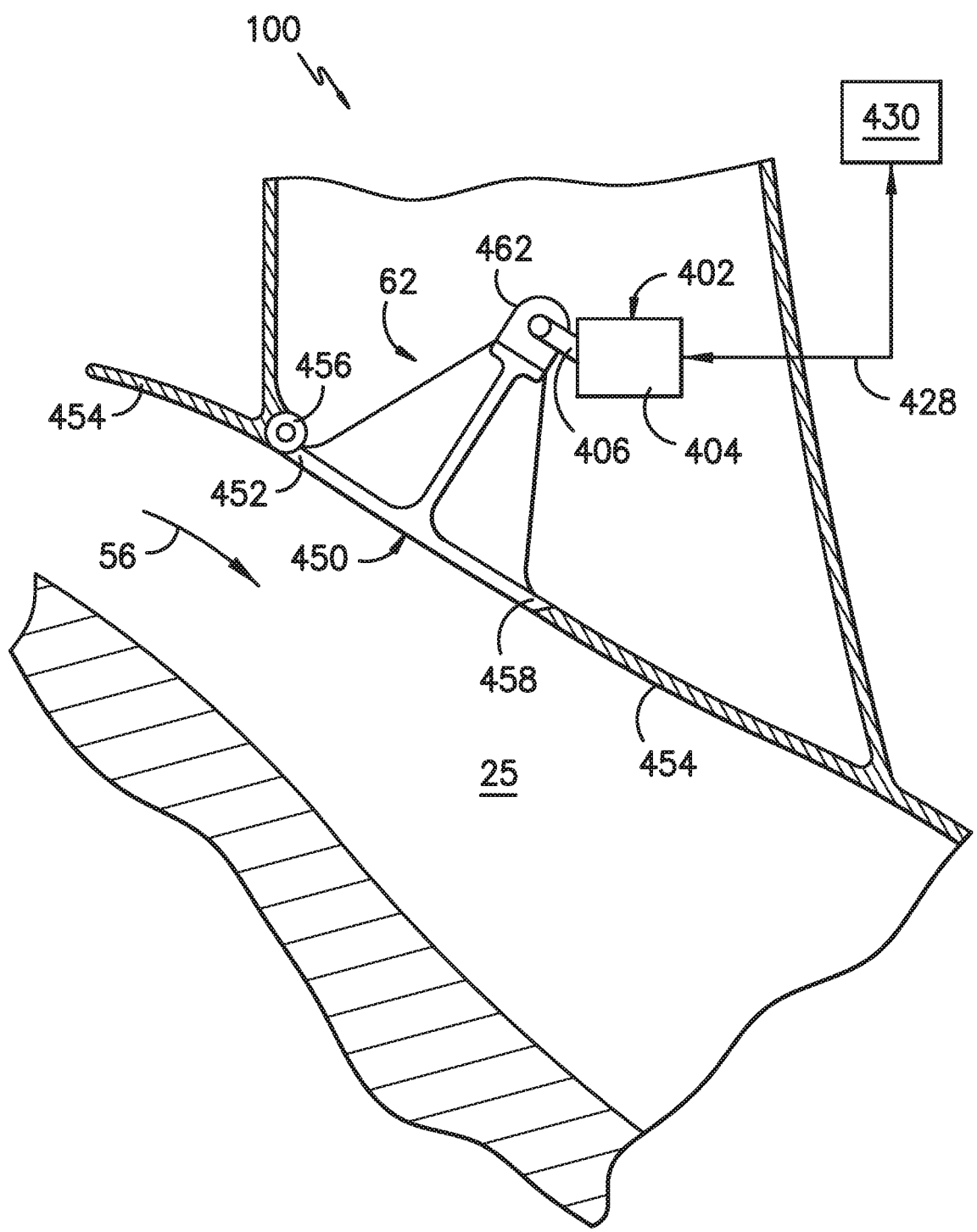
FIG. -9-

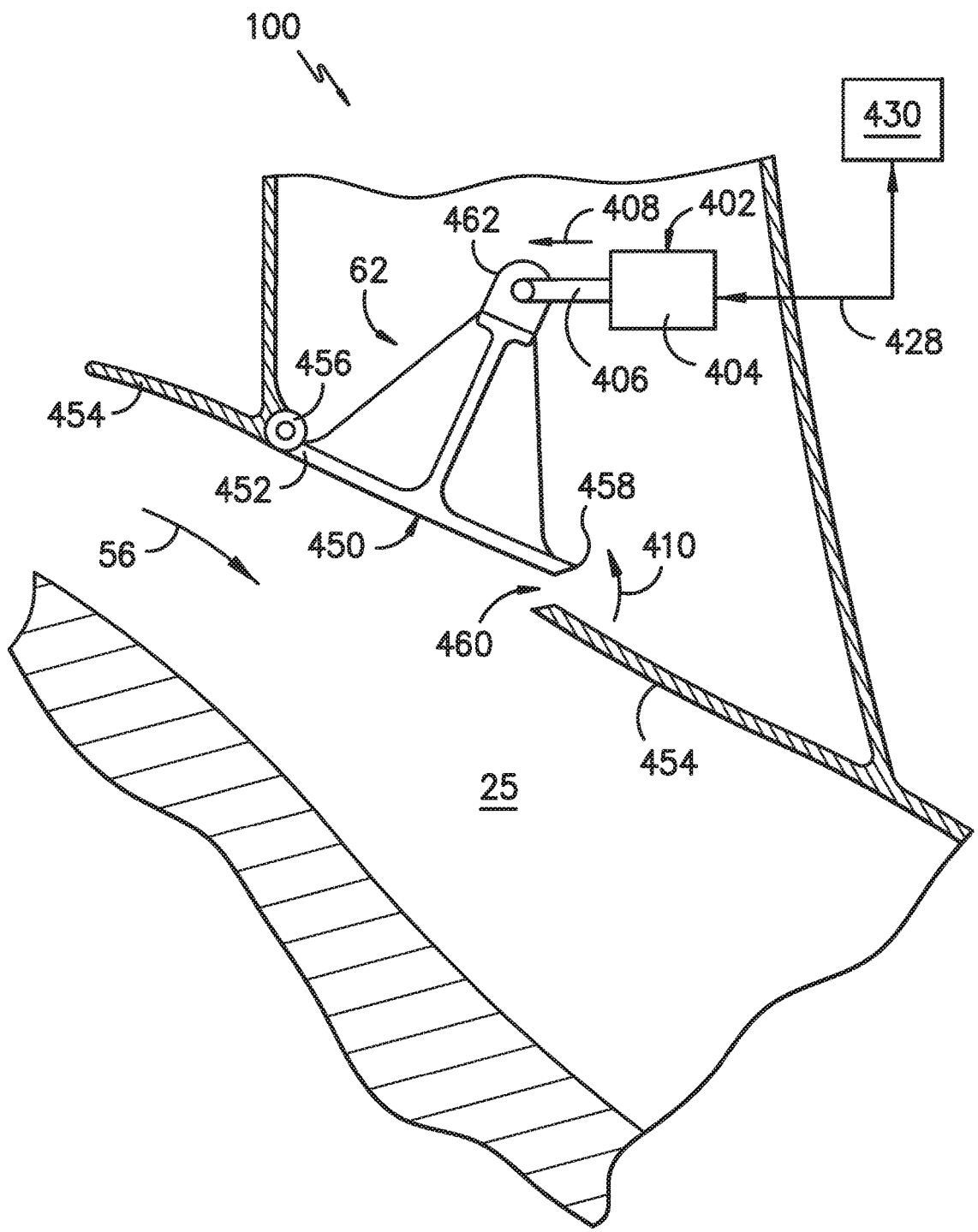
FIG. -10-

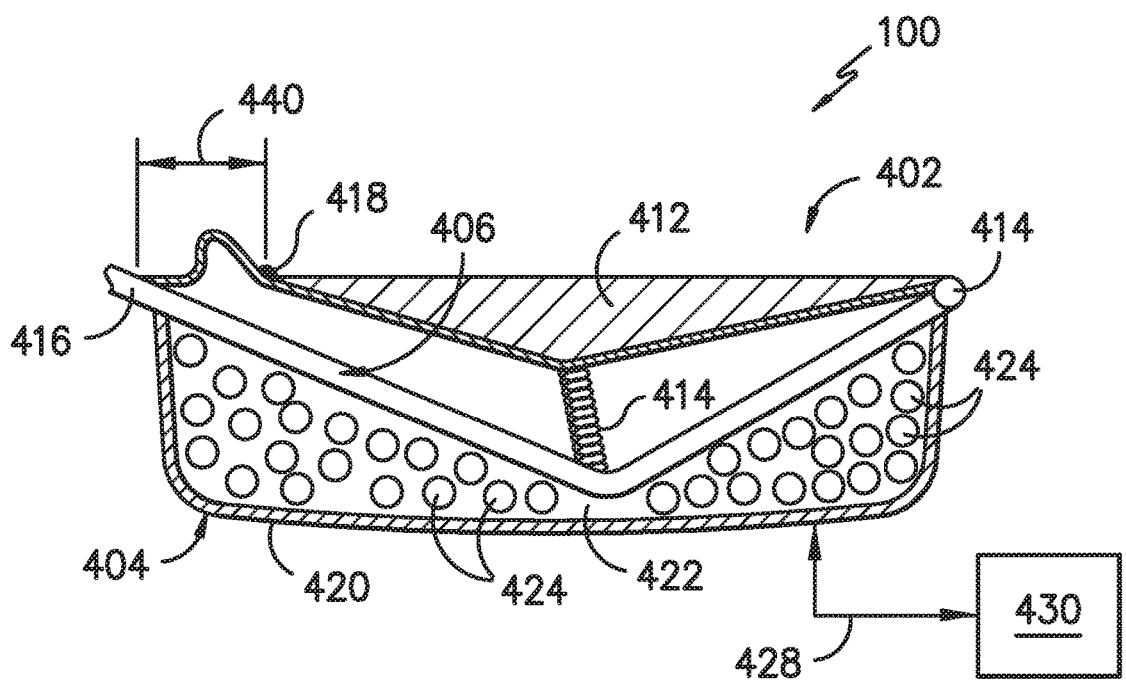
FIG. -11-
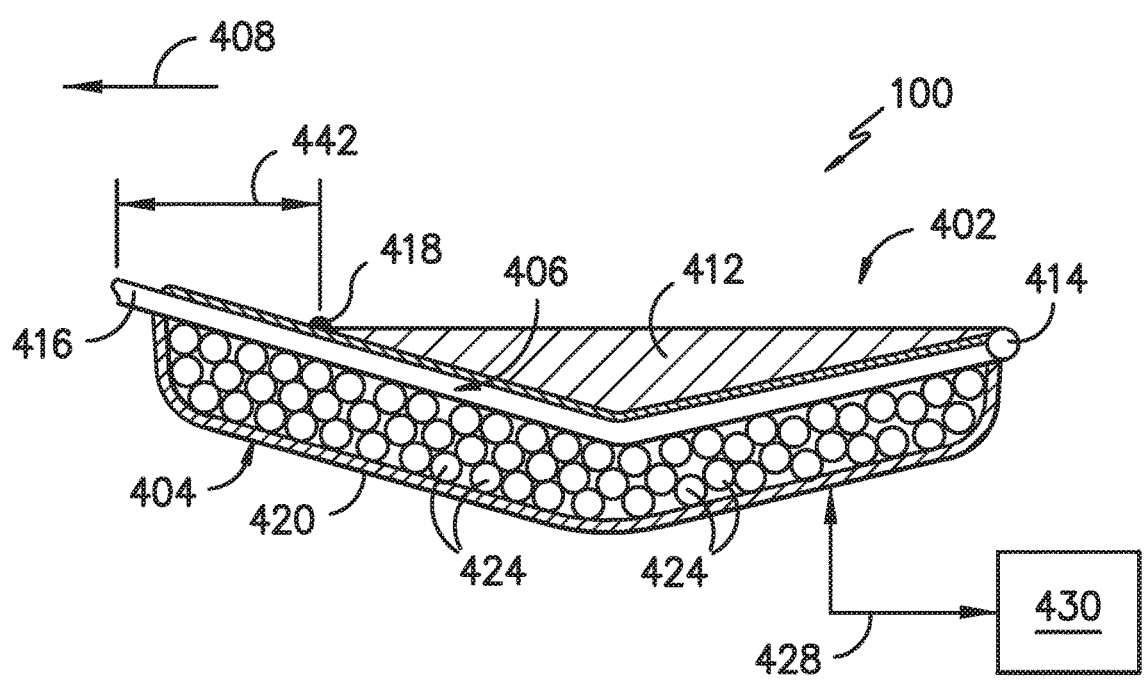
FIG. -12-

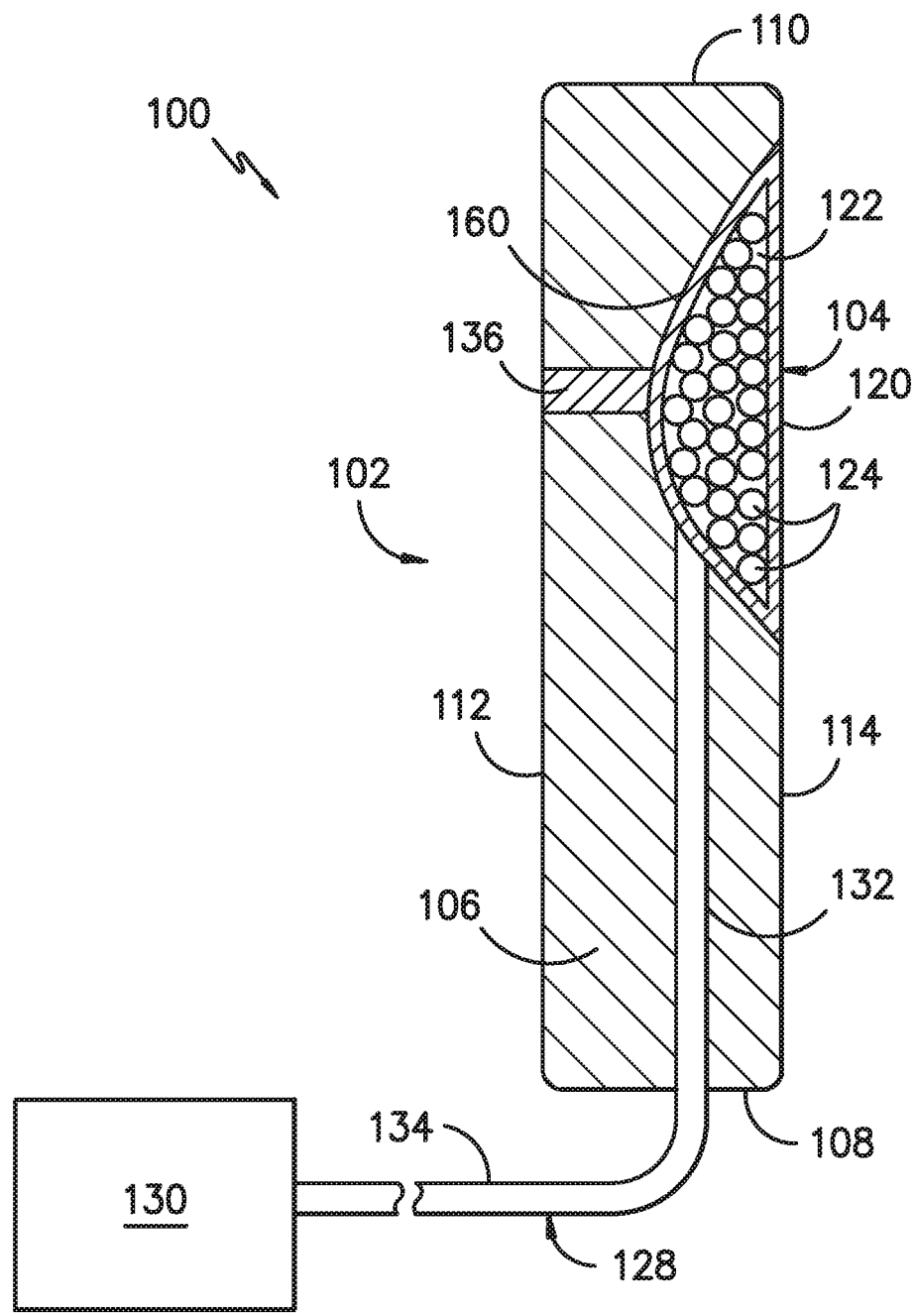
FIG. -13-

SYSTEM AND METHOD FOR ACTUATING GAS TURBINE ENGINE COMPONENTS USING INTEGRATED JAMMING DEVICES

FIELD OF THE INVENTION

The present subject matter relates generally to gas turbine engines and, more particularly, to a system and method for actuating a component of a gas turbine engine using an integrated jamming device.

BACKGROUND OF THE INVENTION

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

When designing gas turbine engines, a common goal is typically to improve efficiency and enhance performance. In this regard, due to the varying operating conditions that exist during operation of a gas turbine engine, it is often desirable to design turbine components that can be actuated or reconfigured to adapt to changing operating conditions within the engine, thereby increasing their associated operating efficiency/performance. However, in practice, the development of such turbine components has proven difficult.

Current technologies for actuation, such as piezoelectrics, smart memory alloys, and mechanical joints have known limitations for engine applications. Piezoelectrics generate insufficient force to displace stiff structures. Shape memory alloys require applications with well understood and controlled temperature conditions, which can be challenging in an aircraft engine environment. Mechanical joints are well controlled, but hinges and joints tend to open and create aero surface discontinuities.

Accordingly, an improved system and method for actuating a turbine component that allows the component's shape, profile and/or configuration to be adapted to accommodate changing operating conditions within a gas turbine engine would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for actuating components of a gas turbine engine. The system may generally include a turbine component incorporating a jamming device. The jamming device may include a bladder and a jammable media contained within the bladder. The jammable media may be jammable within the bladder from an unjammed state, wherein a fluid is contained within the bladder, to a jammed state, wherein the fluid is at least partially evacuated from the bladder. The system may also include a fluid coupling in fluid communication with the bladder. A portion of the turbine component may be located at a first position when the jammable media is in the unjammed state. Additionally, such portion of the turbine component may be located at a second position when the jammable media is in the jammed state.

In another aspect, the present subject matter is directed to a turbine component for a gas turbine engine. The turbine component may include a body and a jamming device provided in operative association with the body. The jamming device may include a bladder and a jammable media contained within the bladder. The jammable media may be jammable within the bladder from an unjammed state, wherein a fluid is contained within the bladder, to a jammed state, wherein the fluid is at least partially evacuated from the bladder. A portion of the body may be located at a first position when the jammable media is in the unjammed state. Additionally, such portion of the body may be located at a second position when the jammable media is in the jammed state.

In a further aspect, the present subject matter is directed to a method for actuating a turbine component of a gas turbine engine, wherein the turbine component incorporates a jamming device including a bladder and a jammable media contained within the bladder. The method may generally include directing fluid into the bladder such that the jammable media is placed in an unjammed state, wherein a portion of the turbine component is located at a first position when the jammable media is in the unjammed state. Additionally, the method may include adjusting a pressure being applied to the jamming device such that the fluid is at least partially evacuated from the bladder to actuate the portion of the turbine component from the first position to a second position as the jammable media transitions from the unjammed state to a jammed state.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a cross-sectional view of one embodiment of a gas turbine engine that may be utilized within an aircraft in accordance with aspects of the present subject matter;

FIG. 2 illustrates a simplified, cross-sectional view of one embodiment of a system for actuating a turbine component of a gas turbine engine using an integrated jamming device in accordance with aspects of the present subject matter, particularly illustrating the turbine component in an un-actuated position;

FIG. 3 illustrates another simplified, cross-sectional view of the system shown in FIG. 2, particularly illustrating the turbine component in an actuated position;

FIG. 4 illustrates a side view of one embodiment of an airfoil of a gas turbine engine having a jamming device incorporated therein in accordance with aspects of the present subject matter;

FIG. 5 illustrates a cross-sectional view of the airfoil shown in FIG. 4 taken about line 5,6-5,6, particularly illustrating a portion of the airfoil in an un-actuated position;

FIG. 6 illustrates another cross-sectional view of the airfoil shown in FIG. 4 taken about line 5,6-5,6, particularly illustrating a portion of the airfoil in an actuated position;

FIG. 7 illustrates a side view of another embodiment of the airfoil shown in FIG. 4, particularly illustrating the airfoil including a plurality of jamming devices incorporated therein in accordance with aspects of the present subject matter;

FIG. 8 illustrates a simplified, cross-sectional view of a flow splitter of a gas turbine engine having a jamming device incorporated therein in accordance with aspects of the present subject matter, particularly illustrating the flow splitter being actuated using the jamming device;

FIG. 9 illustrates a simplified, cross-sectional view of a transition duct of the gas turbine engine shown in FIG. 1, particularly illustrating a variable bleed valve of the gas turbine engine in an closed position relative to the transition duct;

FIG. 10 illustrates another simplified, cross-sectional view of the transition duct shown in FIG. 9, particularly illustrating the variable bleed valve in an opened position relative to the transition duct;

FIG. 11 illustrates a simplified, cross-sectional view of one embodiment of a valve actuator incorporating a jamming device that may be used to actuate the variable bleed valve shown in FIGS. 10 and 11 between the opened and closed positions, particularly illustrating an actuator arm of the valve actuator in an un-actuated position;

FIG. 12 illustrates another simplified, cross-sectional view of the valve actuator shown in FIG. 11, particularly illustrating the actuator arm of the valve actuator in an actuated position; and FIG. 13 illustrates a similar cross-sectional view of the turbine component shown in FIG. 2, particularly illustrating the turbine component defining a different shaped cavity for receiving the jamming device.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for actuating turbine components of a gas turbine engine using integrated jamming devices. Specifically, in several embodiments, one or more jamming devices may be integrated into or otherwise incorporated within a given turbine component to enable targeted actuation of one or more portions of the turbine component, thereby allowing the component's performance to be adapted to changing operating conditions within the gas turbine engine. For instance, a jamming device(s) may be incorporated into an airfoil of the gas turbine engine to allow the overall shape or profile of the airfoil to be varied based on the desired flow characteristics of the airflow through the engine. Similarly, in another embodiment, a jamming device(s) may be incorporated into the flow splitter of the gas turbine engine to allow the splitter to be actuated relative to the compressor inlet, which may provide a means for varying the amount airflow into the compressor. Additionally, in further embodiments, the disclosed jamming devices may be incorporated into any other suitable components of a gas turbine engine. For example, a jamming device(s) may be incorporated into a valve actuator to provide a simple and effective means for actuating a valve of the engine (e.g., a variable bleed valve).

As will be described below, each jamming device may generally include a flexible bladder configured to contain both a fluid (e.g., air) and a jammable media (e.g., sand, glass beads, etc.). The bladder may form a sealed or enclosed volume to allow a vacuum to be applied to the jamming device for evacuating at least a portion of the fluid contained within the bladder. Such evacuation of the fluid from the bladder may cause the jammable media to transition from an unjammed state to a jammed state, thereby compressing the jamming device and applying a jamming force against the turbine component within which the device is incorporated. This compressive jamming force may serve to actuate a portion of the turbine component from an initial or un-actuated position to an actuated position.

It should be appreciated that, in several embodiments, it may be desirable for structural fibers, such as glass, carbon, Kevlar, steel or other metal fibers, to be embedded in the flexible bladder to impart sufficient stiffness in order to exert sufficient force on the structure, thereby allowing the bladder to be used to displace structural materials. However, the bladder may still need to maintain sufficient compressive compliance and strain capability to jam the media in the evacuated state. In one embodiment, an elastomeric composite may be used to provide such characteristics.

It should be appreciated that, in several embodiments of the present subject matter, the disclosed jamming device(s) may correspond to the means for actuating a given turbine component. Alternatively, a separate actuation means (e.g., by using resistive heating, shape-memory alloys, mechanical actuators, and/or the like) may be used to initially actuate the turbine component. In such an embodiment, the jamming device(s) incorporated into the turbine component may serve as a means for maintaining the component in its actuated state. For instance, upon actuation of the turbine component, the jamming device(s) may be jammed to maintain the component at its actuated position. Thereafter, when the jamming device(s) is unjammed, the turbine component may be allowed to return to its un-actuated state or position.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular compressor inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air flowing through a transition duct 25 from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and is split at a flow splitter 51 into a first compressed air flow (indicated by arrow 54) that moves through the bypass airflow conduit 48 and a second compressed air flow (indicated by arrow 56) which enters the booster compressor 22 via the compressor inlet 20. The pressure of the second compressed air flow 56 is then increased and flows through the transition duct 25 to the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

It should be appreciated that, in one embodiment, the gas turbine engine 10 may also include one or more variable bleed valves 62 (indicated by dashed lines in FIG. 1) provided in flow communication with the transition duct 25 extending between the booster compressor 22 and the high pressure compressor 24. As is generally understood, the bleed valve 62 may be opened, as desired or is necessary, to allow a portion of the air flowing through the transition duct 25 to be bled from the second compressed airflow 56 at a location downstream of the booster compressor 22.

Referring now to FIGS. 2 and 3, a simplified, schematic view of one embodiment of a system 100 for actuating a turbine component 102 using a jamming device 104 is illustrated in accordance with aspects of the present subject matter. In general, the turbine component 102 may correspond to any suitable component utilized within a gas turbine engine 10. For instance, as will be described below with reference to FIGS. 4-7, the turbine component 102 may, in one embodiment, correspond to an airfoil used within a gas turbine engine 10, such as the airfoil forming all or part of one of the outlet guide vanes 42 or one of the fan blades 44 of the gas turbine engine 10 shown in FIG. 1. In other embodiments, the turbine component 102 may correspond to any other suitable component of the gas turbine engine 10 that is desired to be actuated in accordance with aspects of the present subject matter, such as the air splitter 51 of the gas turbine engine 10 or a valve actuator associated with a valve of the gas turbine engine 10 (e.g., bleed valve 62).

Additionally, it should be appreciated that the turbine component 102 may generally include a primary body 106 formed from any suitable material. For instance, in one embodiment, the body 106 may be formed from a composite material. Alternatively, the body 106 of the turbine component 102 may be formed from any other suitable material, such as a metallic material.

As shown in FIGS. 2 and 3, the system 100 may include a jamming device 104 incorporated into a portion of the body 106 of the turbine component 102. For instance, in the illustrated embodiment, the body 106 extends lengthwise between a first end 108 and a second end 110 and widthwise between a first side 112 and an opposed second side 114, with the jamming device 104 generally being incorporated into the turbine component 102 so as to be positioned along the second side 114 of the body 106 at a location between its first and second ends 108, 110. Specifically, as shown in FIGS. 2 and 3, the jamming device 104 is positioned along the second side 114 of the body 106 so as to extend to a location generally adjacent to the second end 110 of the body 106. However, in other embodiments, the jamming device 104 may be positioned at any other suitable location on and/or within the turbine component 102, such as by being positioned along the first side 112 of the body 106 and/or by being positioned closer to the first end 108 of the body 106.

In general, the jamming device 104 may include a flexible bladder 120 configured to contain both a fluid 122 (e.g., any suitable gas, such as air, and/or any other suitable liquid, such as water) and a jammable media 124. The bladder 120 may generally form a sealed or enclosed volume to allow a vacuum to be applied to the jamming device 104, thereby providing a means for evacuating at least a portion of the fluid 122 contained within the bladder 102. Such evacuation of the fluid 122 from the bladder 120 may cause the jammable media 124 to transition from an unjammed state (FIG. 2), within which the media 124 is loosely (or non-densely) contained within the bladder 120, to a jammed state (FIG. 3), within which the jammable media 124 is densely packed within the bladder 120. By jamming the jammable media 124 within the bladder 120, the jamming device 104 may compress relative to the body 106, thereby applying a compressive jamming force that causes at least a portion of the body 106 positioned adjacent to the jamming device 104 to be actuated relative to the remainder of the body 106. For example, as shown in FIG. 2, when the jammable media 124 is in its unjammed state, the body 106 of the turbine component 102 may define a generally straight lengthwise profile between its first and second ends 108, 110. However, as shown in FIG. 3, when at least a portion of the fluid 122 is evacuated from the bladder 102, the compressive force provided by the jamming device 104 as the jammable media 124 is jammed within the bladder 120 may cause the second end 110 of the body 106 to actuate or shift positions relative to the first end 108 of the body 106, thereby morphing or adjusting the shape of the turbine component 102 from the straight lengthwise profile to a slightly curved profile between its first and second ends 108, 110. The overall change in position of the second end 110 of the body 106 is generally indicated by the hidden lines 126 in FIG. 3, which indicate the original position of the second end 110 prior to activation of the jamming device 104.

It should be appreciated that the bladder 120 may generally be formed from any suitable flexible material that allows the jamming device 104 to compress or otherwise deform when the jammable media 124 transitions from its unjammed state to its jammed state. In a particular embodiment of the present subject matter, the bladder 120 may correspond to a thin-skinned vessel formed from a fiber-reinforced composite material that provides the desired flexibility while also providing other desirable material properties (e.g., high tensile modulus). For instance, the fiber-reinforced composite may include a plurality of fibers (e.g. Kevlar, steel, glass or carbon fibers) surrounded by an elastic matrix material (e.g. rubber-based matrix materials including, but not limited to, silicon, polyurethane, nitrile rubber, EPDM, fluoroelastomer and/or the like). In such an embodiment, the fibers forming the bladder 120 may be oriented in any suitable manner, including having a unidirectional, bidirectional or triaxial configuration. Specifically, the orientation of the fibers may be selected, for example, based on the particular application within which the disclosed jamming device 104 is being used, including considerations of the actuation direction of the associated turbine component 102 relative to the orientation of the fibers.

It should also be appreciated that the jammable media 124 may generally correspond to any suitable media including a plurality of particulates, granules, and/or other particle-like objects that are capable of being jammed in the manner described herein. For instance, the jammable media 124 may correspond to sand, glass beads and/or any other small granular media. In other embodiments, the jammable media 124 may correspond to any other suitable media, such as plates, laminate structures and/or the like. The jammable media 124 may be formed from any suitable material and/or may have suitable shape (e.g., spherical, cub-like, etc.) and/or size (e.g., a uniform size or varying sizes).

As shown in FIGS. 2 and 3, to allow the fluid 122 contained within the bladder 120 to be evacuated therefrom, a suitable fluid coupling 128 may be provided in flow communication between the bladder 120 and a negative pressure source 130. In general, the fluid coupling 128 may correspond to any suitable conduit, opening, passageway and/or the like that provides a flow path for fluid flowing between the bladder 120 and the negative pressure source 130. For instance, in the illustrated embodiment, the fluid coupling 128 is formed by a combination of both an internal passageway 132 defined in the body 106 that extends between the bladder 120 and the outer surface of the turbine component 102 and a separate fluid conduit 134 that extends between the internal passageway 132 and the negative pressure source 130. However, in other embodiments, all or a portion of the fluid coupling 128 may be formed from any other suitable component and/or combination of components.

It should be appreciated that the negative pressure source 130 may generally correspond to any suitable mechanism, device and/or other source of negative pressure that is capable of applying a vacuum to the bladder 120 via the fluid coupling 128 so as to create a pressure differential that serves to evacuate all or a portion of the fluid 122 contained within the bladder 120. For instance, in one embodiment, the negative pressure source 130 may correspond to a pump configured to create a vacuum within the fluid coupling 128 to facilitate removal of the fluid 122 from the bladder 120. In such an embodiment, when the pump is turned off (or its operation is reversed), the fluid 122 may return to the bladder 120 via the fluid coupling 128 to allow the jamming device 104 to expand or decompress as the turbine component 102 returns to its original, un-actuated position (e.g., as shown in FIG. 2).

Additionally, as shown in FIGS. 2 and 3, in one embodiment, the turbine component 102 may include a flexible joint 136 positioned at or adjacent to the jamming device 104 to facilitate actuation of the surrounding portion of the body 106 when the device 104 is jammed or compressed. For example, as shown in the illustrated embodiment, the flexible joint 136 extends from the jamming device 104 to the opposed side 112 of the body 106. As such, when the jamming device 104 compresses along the second side 114 of the body 106 as the jammable media 124 is jammed, the flexible joint 136 may expand or deform along the first side 112 of the body 106 to allow the turbine component 102 to be actuated in the manner shown in FIG. 3.

It should be appreciated that, in one embodiment, the flexible joint 136 may be formed from a differing material than the material used to form the body 106 of the turbine component 102. For instance, in one embodiment, the flexible joint 136 may be formed from a rubber-based material or any other suitable flexible and/or elastic material. Alternatively, the flexible joint 136 may be formed by a portion of the body 106 itself. For instance, as will be described below with reference to FIG. 8, the wall thickness of the turbine component 102 at a location adjacent to the jamming device 104 may be selected such that the body 106 of the component 102 is allowed to slightly flex or deform when the jamming device 104 is compressed.

It should also be appreciated that the disclosed jamming device 120 may generally be incorporated into a portion or cavity defined by the turbine component 102 having any suitable shape. For instance, in the embodiment shown in FIGS. 2 and 3, the cavity within which the jamming device 120 is incorporated defines a generally rectangular cross-sectional shape. However, in other embodiments, the cavity may have any other suitable shape. For example, FIG. 13 illustrates a similar cross-sectional view of the turbine component 102 shown in FIG. 2, particularly illustrating the jamming device 120 being incorporated into a different shaped cavity. As shown FIG. 13, the cavity within which the jamming device 120 is incorporated includes an arcuate or curved inner surface 160 such that the cavity defines a semi-circular or semi-elliptical cross-sectional shape.

Referring now to FIGS. 4-6, one embodiment of a specific application of the system 100 described above with reference to FIGS. 2 and 3 is illustrated in accordance with aspects of the present subject matter, particularly illustrating an airfoil 202 having a jamming device 204 incorporated therein. Specifically, FIG. 4 illustrates a side view of the airfoil 202. Additionally, FIGS. 5 and 6 illustrate cross-sectional views of the airfoil 202 taken about line 5,6-5,6 shown in FIG. 4, particularly illustrating an example of the manner in which the airfoil 202 may be actuated when the jamming device 204 transitions from its unjammed state (FIG. 5) to its jammed state (FIG. 6). It should be appreciated that, in the illustrated embodiment, the airfoil 202 corresponds to an airfoil for one of the outlet guide vanes 42 of the gas turbine engine 10 shown in FIG. 1. However, in other embodiments, the airfoil 202 may correspond to any other suitable airfoil utilized within a gas turbine engine 10. For instance, in another embodiment, the airfoil 202 may correspond to the airfoil of a fan blade 44 of the gas turbine engine 10.

As shown in the illustrated embodiment, the airfoil 202 may generally be configured to extend lengthwise between a radially inner end 206 and a radially outer end 208. In addition, the airfoil 202 may include a pressure side 210 and a suction side 212 extending between a leading edge 214 and a trailing edge 216. Moreover, as indicated above, the airfoil 202 may also include a jamming device 204 incorporated therein. Specifically, as shown in the FIG. 4, the jamming device 204 is incorporated into the airfoil 202 such that the device 204 extends radially along the pressure side 210 between the inner and outer ends 206, 208 of the airfoil 202 at a chordwise location generally adjacent to the trailing edge 216. However, in other embodiments, the jamming device 204 may be incorporated into the airfoil 202 at any other suitable location, such as by being located on the suction side 212 of the airfoil 202 and/or by being positioned at a chordwise location that is closer to the leading edge 214 of the airfoil 202.

In general, the jamming device 204 may be configured the same as or similar to the jamming device 104 described above with reference to FIGS. 2 and 3. For instance, as shown in FIGS. 5 and 6, the jamming device 204 may include a flexible bladder 220 configured to contain both a fluid 222 and a jammable media 224. Additionally, the bladder 220 may be in fluid communication with a negative pressure source 230 via a fluid coupling 228, thereby allowing a vacuum to be applied to the jamming device 204 to evacuate at least a portion of the fluid 228 contained within the bladder 220. Such evacuation of the fluid 222 from the bladder 220 may cause the jammable media 224 to transition from its unjammed state (FIG. 5) to its jammed state (FIG. 6). As a result, the jamming device 204 may compress relative to the remainder of the airfoil 202, thereby applying a compressive jamming force along the pressure side 210 of the airfoil 202 to actuate a portion of the airfoil 202 located adjacent to the jamming device 204. For example, as particularly shown in FIG. 6, when the fluid 222 is evacuated from the bladder 220, the compressive force provided by the jamming device 204 may cause a trailing edge portion of the airfoil 202 to shift from an un-actuated position (indicated by dashed lines 226 in FIG. 6) to an actuated position (indicated by the solid lines in FIG. 6). Such actuation of the trailing edge 216 may adjust the camber of the airfoil 202, thereby allowing the flow characteristics of the airflow across the airfoil 202 to be varied.

As shown in FIGS. 5 and 6, in one embodiment, a flexible joint 236 may also be incorporated into the airfoil 202 at or adjacent to the jamming device 204 to facilitate actuation of the airfoil 202 when the jammable media 224 is transitioned its jammed sate. For example, as shown in the illustrated embodiment, the flexible joint 236 extends from the jamming device 204 to the suction side 212 of the airfoil 202. As such, when the jamming device 204 compresses along the pressure side 210 of the airfoil 202 as the jammable media 224 is jammed, the flexible joint 236 may expand or deform along the suction side 212 to allow the airfoil 202 to be actuated in the manner shown in FIG. 6. As an alternative to a separate flexible joint, the wall thickness of the airfoil 202 defined between the jamming device 204 and the suction side 212 of the airfoil 202 may be specifically tailored such that the airfoil 202 is allowed to bow or flex at the location of the jamming device 204 to provide the desired actuation.

It should be appreciated that, in the illustrated embodiment, the jamming device 204 allows for the trailing edge 216 of the airfoil 202 to be actuated relative to the leading edge 214. However, in other embodiments, the jamming device 204 may be incorporated into the airfoil 202 such that, when the jammable media 224 is jammed, the leading edge 214 of the airfoil 202 is actuated relative to the trailing edge 216.

It should also be appreciated that, although the embodiment in FIGS. 4-6 illustrates the airfoil 202 as including a single jamming device 204, the airfoil 202 may, instead, include any number of jamming devices 204 incorporated therein. For instance, FIG. 7 illustrates a side view of an alternative embodiment of the airfoil 202 shown in FIG. 4. As shown, as opposed to a single jamming device 204, the airfoil includes multiple jamming devices 204 spaced apart radially from one another between the inner and outer ends 206, 208 of the airfoil 204. In such an embodiment, each jamming device 204 may be provided in fluid communication with the fluid coupling 228 (e.g., via a separate fluid connection or a common fluid connection) to allow the fluid contained within each jamming device 204 to be evacuated therefrom when actuating the airfoil 202 to its actuated position.

Referring now to FIG. 8, another embodiment of a specific application of the system 100 described above with reference to FIGS. 2 and 3 is illustrated in accordance with aspects of the present subject matter, particularly illustrating the flow splitter 51 of the gas turbine engine 10 described above with reference to FIG. 1 having a jamming device 304 incorporated therein. As indicated above, the initial airflow into the engine 10 (indicated by arrow 50) may flow past the fan blades 44 (FIG. 1) and may then be split at the flow splitter 51 into a first compressed air flow (indicated by arrow 54) that is directed through the bypass airflow conduit 48 defined between the fan casing 40 and the outer casing 18 and a second compressed air flow (indicated by arrow 56) that is directed through the compressor inlet 20 and enters the booster compressor 22 (or the high pressure compressor 24 in embodiments in which the engine 10 does not include a booster compressor 22).

As shown, the flow splitter 51 may include a jamming device 304 incorporated therein at a location adjacent to a tip end 306 of the splitter 51. In general, the jamming device 304 may be configured the same as or similar to the jamming devices 104, 204 described above with reference to FIGS. 2-7. For instance, the jamming device 304 may include a flexible bladder 320 configured to contain both a fluid 322 and a jammable media 324. Additionally, the bladder 320 may be in fluid communication with a negative pressure source 330 via a fluid coupling 328, thereby allowing a vacuum to be applied to the jamming device 304 to evacuate at least a portion of the fluid contained within the bladder 320. Such evacuation of the fluid from the bladder 320 may cause the jammable media 324 to transition from its unjammed state to its jammed state. As a result, the jamming device 304 may compress relative to the remainder of the flow splitter 51, thereby applying a compressive jamming force that causes the tip end 306 of the splitter 51 to be actuated from an initial position to an actuated position. For example, as shown in FIG. 8, when the fluid 322 is evacuated from the bladder 320, the compressive force provided by the jamming device 304 may cause the tip end 306 of the splitter 51 to shift from its initial position (indicated by solid lines in FIG. 8) to an actuated position (indicated by dashed lines 326 in FIG. 8). Such actuation of the tip end 306 of the splitter 51 may be used to adjust the ratio of the air being split between the first and second compressed air flows 54, 56, thereby allowing the amount of air being directed into the compressor inlet 20 to be varied.

It should be appreciated that, to facilitate actuation of the tip end 306 of the flow splitter 51, the wall thickness of the portion 336 of the splitter 51 extending adjacent to the jamming device 304 may, in one embodiment, be selected so as to provide sufficient flexibility to the splitter 51. Alternatively, as described above, a separate flexible joint (e.g., an elastomeric joint) may be incorporated to the flow splitter 51 at a location adjacent to the jamming device 304 to provide the desired flexibility.

Referring now to FIGS. 9-12, yet another embodiment of a specific application of the system 100 described above with reference to FIGS. 2 and 3 is illustrated in accordance with aspects of the present subject matter, particularly illustrating a valve actuator 402 of a gas turbine engine having a jamming device 404 incorporated therein. Specifically, FIGS. 9 and 10 illustrate cross-sectional views of the area surrounding the transition duct 25 extending between the booster compressor 22 and the high pressure compressor 24 of the gas turbine engine 10 shown in FIG. 1, particularly illustrating a variable bleed valve 62 of the engine 10 in a closed position (FIG. 9) and an opened position (FIG. 10). Additionally, FIGS. 11 and 12 illustrate simplified, cross-sectional views of one embodiment of the valve actuator 402 used to actuate the variable bleed valve 62 between its opened and closed positions, particularly illustrating the valve actuator 402 in an un-actuated or neutral state (FIG. 11) and an actuated state (FIG. 12).

As shown in FIGS. 9 and 10, the variable bleed valve 62 may include a valve door 450 extending between a forward end 452 pivotally coupled to a wall 454 of the transition duct 25 via a hinge 456 and an aft end 458 that is configured to be actuated or moved relative to the duct wall 454 so as to expose or close a bleed inlet 460 (FIG. 10) defined through the wall 454. Additionally, as shown in the illustrated embodiment, the variable bleed valve 62 may also include a clevis 462 at its radially outer end that is configured to be coupled to the disclosed valve actuator 402. Specifically, in several embodiments, the clevis 462 may be coupled to an actuator arm 406 of the valve actuator 402 such that actuation of the actuator arm 406 results in the valve door 450 being pivoted relative to the duct wall 454 from its closed position to its opened position. For example, as shown in FIG. 9, when the actuator arm 406 is in its actuated or neutral state, the valve door 45— may be in its closed position, thereby sealing off the bleed inlet 460. However, as shown in FIG. 10, when the actuator arm 406 is actuated outwardly (as indicated by arrow 408), the aft end 458 of the valve door 450 may pivot radially outwardly relative to the duct wall 454 (as indicated by arrow 410), thereby exposing the bleed inlet 460 and allowing a portion of the compressed airflow 56 flowing through the transition duct 25 to be bled off.

In several embodiments, the valve actuator 402 may be configured to utilize one or more jamming features to facilitate actuation of the actuator arm 406. Specifically, as shown in FIGS. 11 and 12, the valve actuator 402 may include a fixed jamming surface 412 and a jamming device 404 coupled to the fixed surface 412 that is configured to actuate the actuator arm 406 as the jamming device 404 is jammed relative to the fixed surface 412. In general, the jamming device 404 may be configured the same as or similar to the jamming devices 104, 204, 304 described above with reference to FIGS. 2-8. For instance, the jamming device 404 may include a flexible bladder 420 configured to contain both a fluid 422 and a jammable media 424. Additionally, the bladder 420 may be configured to receive and/or surround a portion of the actuator arm 406. For instance, as shown in FIGS. 11 and 12, the bladder 420 may be coupled to the actuator arm 406 at or adjacent to both a pivot end 414 and an actuation end 416 of the actuator arm 406 to provide a sealed connection between the components.

Moreover, as shown in the illustrated embodiment, the bladder 420 may be in fluid communication with a negative pressure source 430 via a fluid coupling 428, thereby allowing a vacuum to be applied to the jamming device 404 to evacuate at least a portion of the fluid 422 contained within the bladder 420. Such evacuation of the fluid from the bladder 420 may cause the jammable media 422 to transition from its unjammed state to its jammed state. As a result, the jamming device 404 may compress relative to the fixed surface 412 and cause the actuator arm 406 to be jammed or compressed against fixed surface 412, thereby resulting in the actuation end 416 of the actuator arm 406 being actuated outwardly relative to the fixed surface 412. For example, as shown in FIG. 11, when the jammable media 420 is in it unjammed state, a portion of the actuator arm 406 may pivot away from the fixed surface 412 about its pivot end 414 such that the actuator end 416 of the arm 406 is located a first distance 440 away from a given reference point 418 on the fixed surface 412. However, as shown in FIG. 12, when the fluid 422 is evacuated from the bladder 32—, the compressive force provided by the jamming device 404 against the fixed surface 412 may cause the actuator arm 406 to pivot upwardly as it is compressed against the fixed surface 412, which results in the outward actuation of the actuator end 416 of the arm 406 (as indicated by arrow 408) such that the actuator end 416 is located a second distance 442 away from the reference point 418 on the fixed surface 412. In such an embodiment, the difference between the first and second distances 440, 442 may be selected so that the actuator arm 406 is moved a sufficient distance to cause the variable bleed valve 62 to be actuated from its closed position to its opened position when the jamming device 404 is activated.

It should be appreciated that, in one embodiment, the valve actuator 402 may also include a biasing mechanism 444 configured to bias the actuator arm 406 into its un-actuated or neutral state. For instance, as shown in FIG. 11, a spring 444 may be coupled between the fixed surface 412 and the actuator arm 406. As such, when the vacuum applied to the bladder 420 is turned off so s to unjam the jamming device 404, the spring 444 may bias the actuator arm 406 away from the fixed surface 412 as fluid is being returned to the bladder 420.

It should also be appreciated that, although the valve actuator 402 shown in FIGS. 9-12 is described herein in association with a variable bleed valve 62, the valve actuator 402 may generally be provided in operative associated with any suitable valve of a gas turbine engine to provide a means for actuating such valve between its opened and closed positions.

Additionally, it should be appreciated that, in general, the present subject has been described herein with reference to the use of a jamming device(s) when actuating a given turbine component. However, in other embodiments, a jamming device(s) may be incorporated into or otherwise associated with a turbine component for the purpose of stiffening the component or for otherwise preventing motion of all or certain portions of the turbine component. For instance, referring to the embodiment shown in FIG. 7, as opposed to serving as a means for actuating the airfoil 202, the jamming devices 204 may be configured to form stiffening ribs when in their jammed state to prevent actuation or relative motion of the airfoil 202.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for actuating components of a gas turbine engine, the system comprising:
    a turbine component incorporating a jamming device, the jamming device including a bladder and a jammable media contained within the bladder, the jammable media being jammable within the bladder from an unjammed state, wherein a fluid is contained within the bladder, to a jammed state, wherein the fluid is at least partially evacuated from the bladder, the jamming device forms a portion of a side of the turbine component; and
    a fluid coupling in fluid communication with the bladder, wherein at least a portion of the turbine component is located at a first position when the jammable media is in the unjammed state, and wherein the at least a portion of the turbine component is located at a second position when the jammable media is in the jammed state.

2. The system of claim 1, wherein the at least a portion of the turbine component is actuated from the first position to the second position as the fluid is at least partially evacuated from the bladder to transition the jammable media from the unjammed state to the jammed state.

3. The system of claim 1, wherein the bladder is formed from a fiber-reinforced composite, the fiber-reinforced composite including an elastic matrix material.

4. The system of claim 1, further comprising a negative pressure source in fluid communication with the fluid coupling, the negative pressure source being configured to apply a vacuum to the fluid coupling such that the fluid contained within the bladder is at least partially evacuated to transition the jammable media to the jammed state.

5. The system of claim 1, wherein the jammable media is transitioned from the unjammed state to the jammed state to maintain the at least a portion of the turbine component at the second position.

6. The system of claim 1, wherein the turbine component corresponds to an airfoil of the gas turbine engine, the airfoil including a first side and a second side extending between a leading edge and a trailing edge, the jamming device being positioned on one of the first side or the second side of the airfoil.

7. The system of claim 6, wherein, when the at least a portion of the airfoil is actuated from the first position to the second position, one of the trailing edge or the leading edge is moved relative to the other of the trailing edge or the leading edge.

8. The system of claim 6, wherein the jamming device is positioned on the first side of the airfoil, the airfoil further comprising a flexible joint extending from the jamming device to the second side of the airfoil.

9. The system of claim 1, wherein the turbine component corresponds to a flow splitter positioned adjacent to a compressor inlet of the gas turbine engine.

10. The system of claim 9, wherein the at least a portion of the flow splitter is actuated from the first position to the second position to vary an airflow through the compressor inlet.

11. The system of claim 1, wherein the turbine component corresponds to a valve actuator coupled to a valve of the gas turbine engine, the valve actuator including an actuator arm, the actuator arm being moved to the first position to actuate the valve to one of an opened position or a closed position, the actuator arm being moved to the second position to actuate valve to the other of the opened position or the closed position.

12. The system of claim 11, wherein the valve actuator further includes a fixed jamming surface, the actuator arm being configured to be jammed against the fixed jamming surface when the jammable media is transitioned to the jammed state.

13. The system of claim 11, wherein the valve corresponds to a variable bleed valve of the gas turbine engine.

14. A turbine component for a gas turbine engine, the turbine component comprising:
    a body;
    a jamming device provided in operative association with the body, the jamming device including a bladder and a jammable media contained within the bladder, the jammable media being jammable within the bladder from an unjammed state, wherein a fluid is contained within the bladder, to a jammed state, wherein the fluid is at least partially evacuated from the bladder, the jamming device forms a portion of a side of the body; and
    wherein at least a portion of the body is located at a first position when the jammable media is in the unjammed state, and wherein the at least a portion of the body is located at a second position when the jammable media is in the jammed state.

15. The turbine component of claim 14, wherein the at least a portion of the body is actuated from the first position to the second position as the fluid is at least partially evacuated from the bladder to transition the jammable media from the unjammed state to the jammed state.

16. The turbine component of claim 14, wherein the body forms all or part of one of an airfoil, a flow splitter or a valve actuator of the gas turbine engine.

17. The turbine component of claim 14, wherein the jammable media is transitioned from the unjammed state to the jammed state to maintain the at least a portion of the turbine component at the second position.

18. A method for actuating a turbine component of a gas turbine engine, the turbine component incorporating a jamming device including a bladder and a jammable media contained within the bladder, the method comprising:
    directing fluid into the bladder such that the jammable media is placed in an unjammed state, at least a portion of the turbine component being located at a first position when the jammable media is in the unjammed state, the jamming device forms a portion of a side of the turbine component; and
    adjusting a pressure being applied to the jamming device such that the fluid is at least partially evacuated from the bladder to actuate the at least a portion of the turbine component from the first position to a second position as the jammable media transitions from the unjammed state to a jammed state.

19. The method of claim 18, wherein adjusting the pressure being applied to the jamming device comprises applying a negative pressure to the jamming device via a fluid coupling provided in fluid communication with the bladder.

20. The method of claim 18, further comprising increasing the pressure being applied to the jamming device such that the evacuated fluid is redirected back into the bladder to actuate the at least a portion of the turbine component from the second position back to the first position as the jammable media transitions from the jammed state to the unjammed state.

* * * * *